United States Patent
Vanderwende et al.

(10) Patent No.: US 7,430,504 B2
(45) Date of Patent: Sep. 30, 2008

(54) METHOD AND SYSTEM FOR RANKING WORDS AND CONCEPTS IN A TEXT USING GRAPH-BASED RANKING

(75) Inventors: Lucretia H. Vanderwende, Sammamish, WA (US); Aurl A. Menezes, Sammamish, WA (US); Michele L. Banko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/825,642

(22) Filed: Apr. 15, 2004

(65) Prior Publication Data
US 2005/0220351 A1 Oct. 6, 2005

Related U.S. Application Data

(60) Provisional application No. 60/549,775, filed on Mar. 2, 2004.

(51) Int. Cl.
*G06F 17/27* (2006.01)
*G06F 17/20* (2006.01)

(52) U.S. Cl. .............................................. 704/9; 704/1

(58) Field of Classification Search ........................ None
See application file for complete search history.

(56) References Cited

U.S. PATENT DOCUMENTS

| | | | | |
|---|---|---|---|---|
| 6,098,033 | A * | 8/2000 | Richardson et al. | 704/1 |
| 6,236,959 | B1 * | 5/2001 | Weise | 704/9 |
| 6,721,697 | B1 * | 4/2004 | Duan et al. | 704/9 |
| 7,146,308 | B2 * | 12/2006 | Lin et al. | 704/9 |

OTHER PUBLICATIONS

Chinese Office Action, Application No. 200510053179.8, dated Dec. 7, 2007.

* cited by examiner

*Primary Examiner*—David R. Hudspeth
*Assistant Examiner*—Samuel G Neway
(74) *Attorney, Agent, or Firm*—Joseph R. Kelly; Westman, Champlin & Kelly, P.A.

(57) ABSTRACT

The present invention is a method and system for identifying words, text fragments, or concepts of interest in a corpus of text. A graph is built which covers the corpus of text. The graph includes nodes and links, where nodes represent a word or a concept and links between the nodes represent directed relation names. A score is then computed for each node in the graph. Scores can also be computed for larger sub-graph portions of the graph (such as tuples) The scores are used to identify desired sub-graph portions of the graph, those sub-graph portions being referred to as graph fragments.

25 Claims, 4 Drawing Sheets

METHOD AND SYSTEM FOR RANKING WORDS AND CONCEPTS IN A TEXT USING GRAPH-BASED RANKING

The present application is based on and claims the benefit of U.S. provisional patent application Ser. No. 60/549,775, filed Mar. 2, 2004, the content of which is hereby incorporated by reference in its entirety.

BACKGROUND OF THE INVENTION

The present invention relates to identifying and retrieving text. More specifically, the present invention relates to identifying and retrieving text portions (or text fragments) of interest from a larger corpus of textual material by generating a graph covering the textual material and scoring portions of the graph.

There are a wide variety of applications which would benefit from the ability to identify text of interest in a larger text corpus. For instance, document clustering and document summarization both attempt to identify concepts associated with documents. Those concepts are used to cluster the documents into clusters, or to summarize the documents. In fact, some attempts have been made to both cluster documents and summarize an entire cluster of documents, automatically, for use in later processing (such as information retrieval).

Prior systems have attempted to order sentences based on how related they are to the concept or subject of a document. The sentences are then compressed and sometimes slightly rewritten to obtain a summary.

In the past, sentence ordering has been attempted in a number of different ways. Some prior systems attempt to order sentences based on verb specificity. Other approaches have attempted to order sentences using heuristics that are based on the sentence position in the document and the frequency of entities identified in the sentence.

All such prior systems have certain disadvantages. For instance, all such prior systems are largely extractive. The systems simply extract words and sentence fragments from the documents being summarized. The words and word order are not changed. Instead, the words or sentence fragments are simply provided, as written in the original document, and in the original order that they appear in the original document, as a summary for the document. Of course, it can be difficult for humans to decipher the meaning of such text fragments.

In addition, most prior approaches have identified words or text fragments of interest by computing a score for each word in the text based on term frequency. The technique which is predominantly used in prior systems in order to compute such a score is the term frequency*inverse document frequency (tf*idf) function, which is well known and documented in the art. Some prior systems used minor variations of the tf*idf function, but all algorithms using the tf*idf class of functions are word-based.

In another area of technology, graphs have been built in order to rank web pages. The graphs are ranked using a hub and authorities algorithm that uses the web pages as nodes in the graph and links to the web page as links in the graph. Such graphing algorithms have not been applied to graph text.

SUMMARY OF THE INVENTION

The present invention is a method and system for identifying words, text fragments, or concepts of interest in a corpus of text. A graph is built which covers the corpus of text. The graph includes nodes and links, where nodes represent a word or a concept and links between the nodes represent directed relation names. A score is then computed for each node in the graph. Scores can also be computed for larger sub-graph portions of the graph (such as tuples). The scores are used to identify desired sub-graph portions of the graph, those sub-graph portions being referred to as graph fragments.

In one embodiment, a textual output is generated from the identified graph fragments. The graph fragments are provided to a text generation component that generates the textual output which is indicative of the graph fragments provided to it.

DETAILED DESCRIPTION OF ILLUSTRATIVE EMBODIMENTS

The present invention relates to identifying words, text fragments, or concepts of interest in a larger corpus of text. Before describing the present invention in greater detail, one illustrative environment in which the present can be used will be described.

Figure 1:
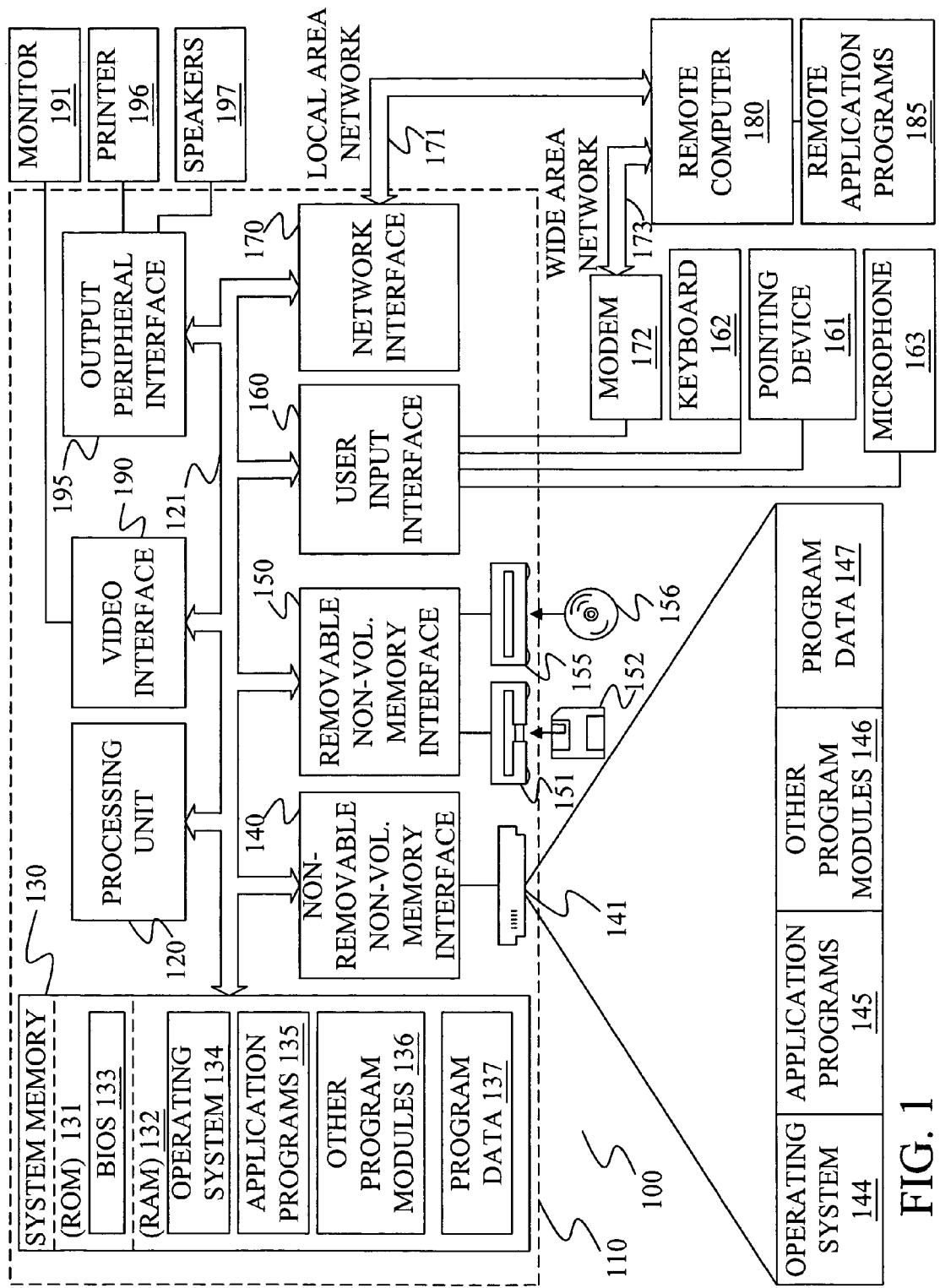
FIG. 1 is block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
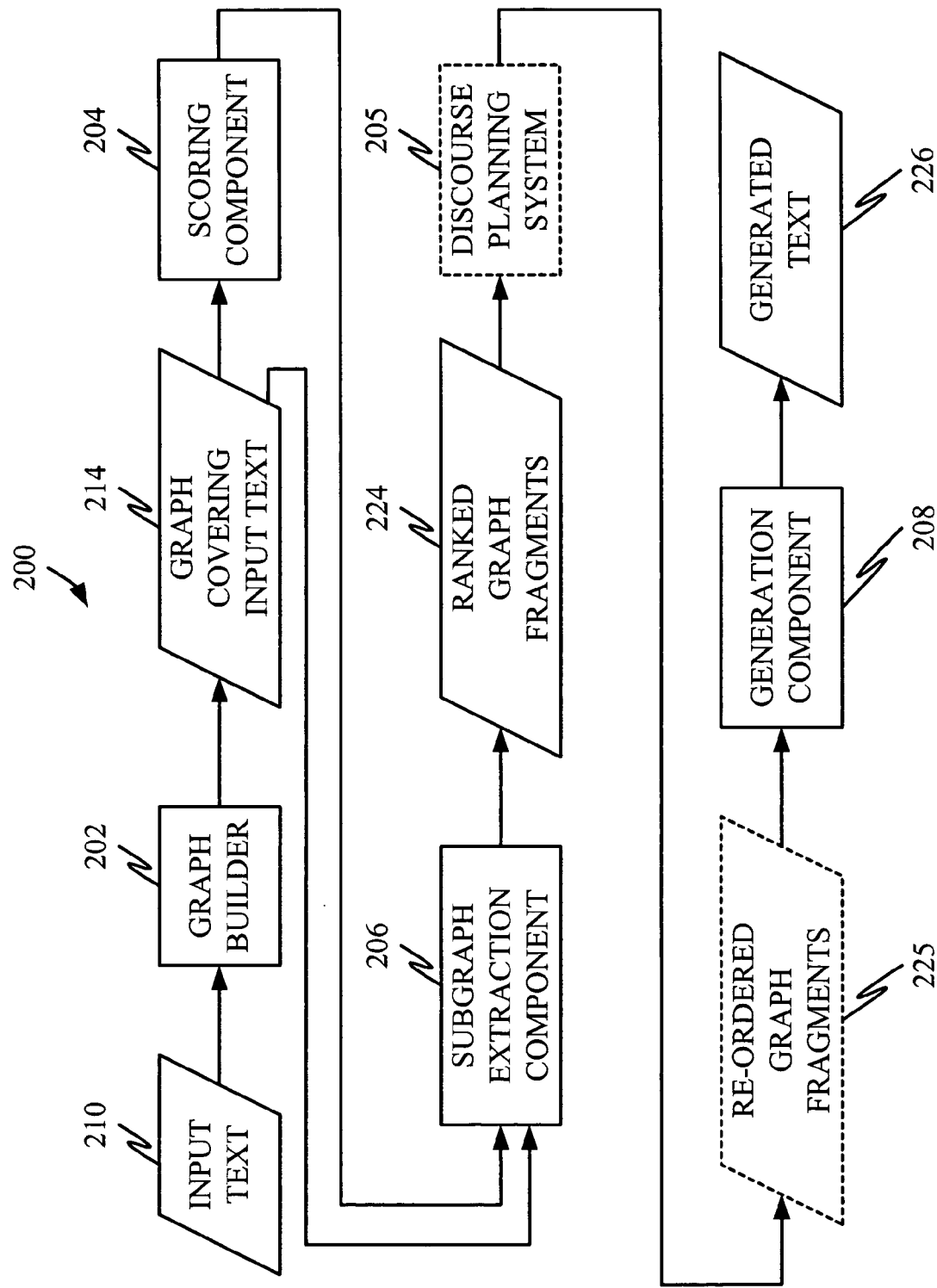
FIG. 2 is a block diagram of one embodiment of a system in accordance with the present invention.
Figure 3:
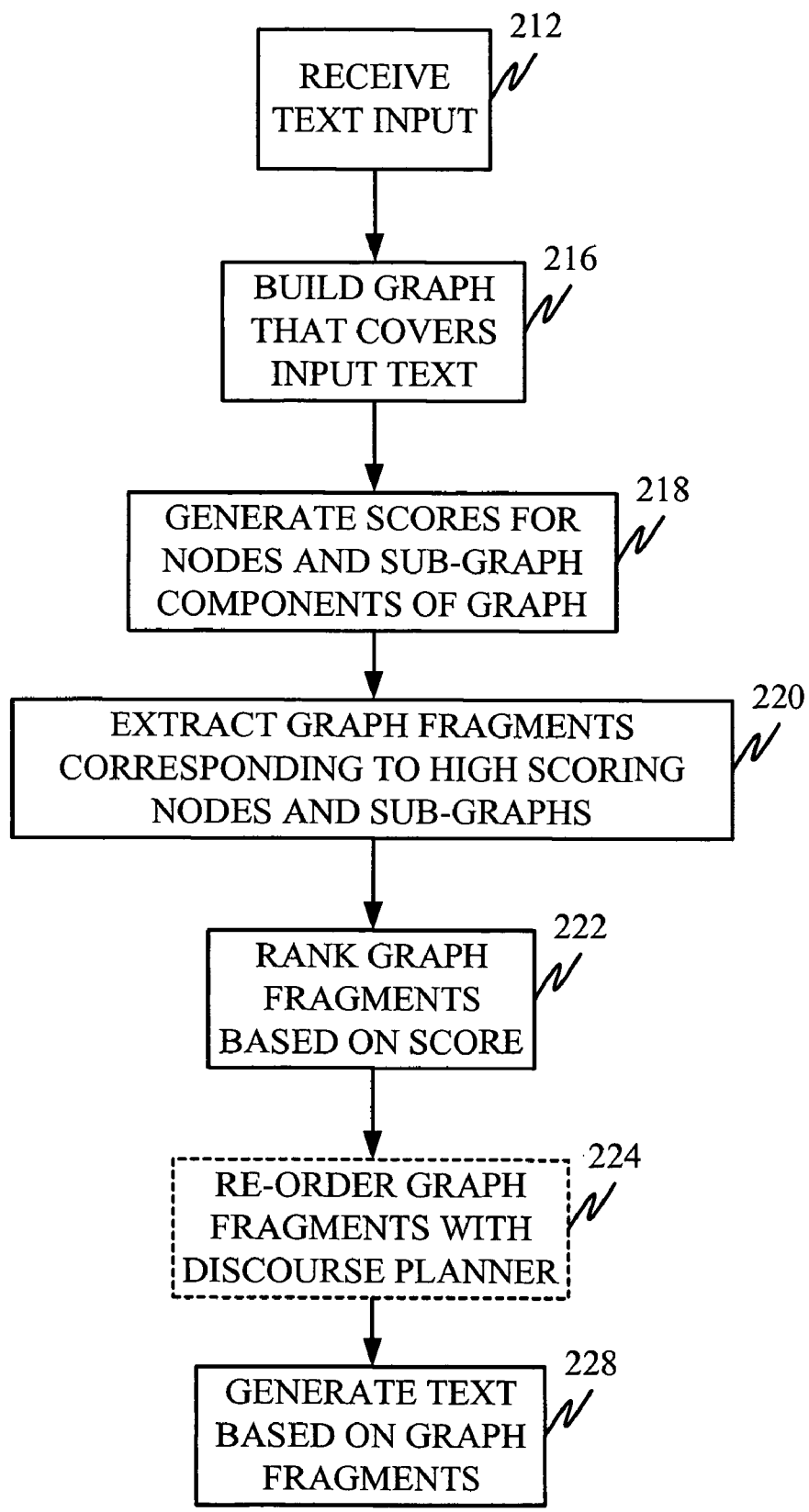
FIG. 3 is a flow diagram illustrating one embodiment of the operation of the system shown in FIG. 2.

FIG. 2 is a block diagram of a text processing system 200 in accordance with one embodiment of the present invention. Text processing system 200 can be used in a wide variety of text manipulation applications. For instance, as is described in greater detail below, it can be used for document clustering, document summarization, summarization of document clusters, question answering, information retrieval, etc. For the sake of simplicity, the present invention will be described in terms of cluster summarization. However, the invention is not to be so limited. System 200 includes graph builder 202, scoring component 204, optional discourse planning system 205, sub-graph extraction component 206 and generation component 208. FIG. 3 is a flow diagram illustrating the operation of system 200 shown in FIG. 2.

In operation, graph builder 202 first receives input text 210. This is indicated by block 212 in FIG. 3. Input text 210 can, for example, be a text corpus comprised of one or more documents. In the case where system 200 is used to summarize document clusters, then the input text 210 is a set of documents which have been previously clustered using any known clustering system.

In any case, graph builder 202 receives input text 210 and builds a graph 214 that covers the entire input text 210. This is illustratively done by first building graphs for the individual sentences in input text 210. The individual graphs are then connected together to form the overall graph 214. In doing this, the individual graphs are somewhat collapsed in that words or concepts in the individual graphs will correspond to a single node in the overall graph 214, no matter how many times they occur in the individual graphs. Generating the overall graph 214 is indicated by block 216 in FIG. 3. In one illustrative embodiment, graph 214 includes nodes and links. The nodes represent a word, event, entity or concept in input text 210, and the links between the nodes represent directed relation names. In one embodiment, a certain set of words can be excluded from graph 214. Such words are commonly referred to as stop words.

In one illustrative embodiment, graph builder 202 is implemented by a natural language processing system that produces an abstract analysis of input text 210. The abstract analysis normalizes surface word order, assigns relation names using function words (such as "be", "have", "with", etc.). The natural language processing system comprising graph builder 202 can also perform anaphora resolution that resolves both pronominal and lexical noun phrase co-reference. One embodiment of such an abstract analysis of input text 210 is referred to as a logical form, and one suitable system for generating the abstract analysis (the logical form) is set out in U.S. Pat. No. 5,966,686 issued Oct. 12, 1999, entitled *METHOD AND SYSTEM FOR COMPUTING SEMANTIC LOGICAL FORMS FROM SYNTAX TREES*. The logical forms are directed acyclic graphs that cover the input text for each sentence. The graphs for each sentence are illustratively connected to one another into a larger graph 214 that covers the entire input text 210.

Of course, graph builder 202 can be another suitable system as well. For instance, graph builder 202 can be configured to produce a syntactic parse of each input sentence in input text 210 and then produce a dependency tree given the syntactic parse. A graph is then illustratively constructed from the dependency tree. Alternatively, graph builder 202 can construct graph 214 for input text 210 by defining pairs of adjacent or co-located words as the nodes in the graph and by positing a link between the nodes where the directionality of the link is either assigned arbitrarily or computed given the parts of speech of the nodes. This can be done either using heuristic or machine-learned methods.

In any case, once graph builder 202 has generated graph 214 from input text 210, nodes or sub-graph components of graph 214 are scored by scoring component 204. This is indicated by block 218 in FIG. 3. In one illustrative embodiment, a publicly available graph ranking algorithm is used for scoring the nodes in graph 214. One example of such a publicly available graph ranking algorithm is referred to as the *Hub and Authorities Algorithm* by John Kleinberg (see: *Authoritative sources in a hyperlinked environment*. Proc. 9th ACM-SIAM Symposium on Discrete Algorithms, 1998. Extended version in Journal of the ACM 46(1999). Also appears as IBM Research Report RJ 10076, 1 May 1997.), which has been used, for example, to rank web pages as set out in Sergey Brin and Lawrence Page. The anatomy of a large-scale hypertextual Web search engine. In Ashman and Thistlewaite [2], pages 107-117. Brisbane, Australia. Briefly, such an algorithm takes the directionality of links in the graph into account in order to produce the ranking. Each node in the graph receives a weight according to how many nodes link to it, and according to how many nodes the given node links to. The output of the algorithm is a score for each node in the graph. The score for a node can be used in place of a score computed using term frequency, for example, in text manipulation applications such as information retrieval, question answering, clustering, summarization, etc.

Once the scores for the nodes are computed, scores for tuples in graph 214 can be calculated. A tuple includes sub-graph components of graph 214 of the form nodeB→relation→nodeA, where node A is referred to as the target node in the tuple and node B is referred to as the initial node in the tuple. In one illustrative embodiment, the score for each tuple is a function of all the scores for nodes linking to node A, the score of node B, and the frequency count of the given tuple in the text corpus 210. The score for each tuple can be used in substantially any application that calls for matching tuples. However, it is described herein with respect to document summarization only, for the sake of simplicity.

In accordance with one embodiment of the present invention, the specific calculation of a tuple score only weights tuples with respect to the target node. For instance, in the tuple nodeB→relation→nodeA, the weight of the tuple is calculated with respect to all the other nodes pointing to node A, and not with respect to other tuples or other nodes. One example of a specific formula used to do this is as follows:

TupleScore(nodeB→relation→nodeA)=NodeScore
(B)* Count(nodeB→relation→nodeA)/Sum(For
all nodes $X$ and relations $R$ such that
nodeX→R→nodeA|NodeScore(X)*Count
(nodeX→R→nodeA)). Eq. 1

Where TupleScore( ) indicates the score of the given tuple; NodeScore( ) indicates the score of the given node; and Count( ) is the frequency of the identified tuple in the input text.

Of course, other scoring mechanisms and equations can be used as well.

Both the scores generated by scoring component 204 and the graph 214 are provided to sub-graph extraction component 206. Sub-graph extraction component 206 uses high scoring nodes and tuples corresponding to graph 214 to identify important sub-graphs generated from input text 210. The sub-graphs are then extracted based on the NodeScores and TupleScores. The sub-graphs can also be ranked by sub-graph extraction component 206 based on their corresponding scores. Extraction of graph fragments corresponding to high scoring nodes and sub-graphs, and ranking the graph fragments based on the scores is indicated by blocks 220 and 222 in FIG. 3. The ranked graph fragments provided by component 206 are indicated by block 224 in FIG. 2.

The graph fragments can be extracted in different ways. For instance, they can be extracted from the individual graphs (or logical forms) generated from the individual sentences in the input text 210, and that spawned the high scoring nodes and tuples in overall graph 214. Alternatively, they can be extracted directly from overall graph 214.

In one illustrative embodiment, sub-graph extraction component 206 identifies the important sub-graphs by matching logical forms generated from input text 210 with the high scoring nodes and tuples. By "high scoring", it is meant that a threshold may be empirically determined and nodes and tuples having a score that meets the threshold are identified as high scoring. Further, each sub-graph can be further investigated in order to extract additional high scoring nodes that are linked to that sub-graph. This process is illustratively iterated, using the high scoring tuple as an anchor, for every high scoring node that the sub-graph can link to.

In addition, nodes in the logical form can be related to another node. This can happen, for example, through pronominalization or by virtue of referring to the same entity or event. For instance, the term "General Augusto Pinochet" and "Pinochet" are related by virtue of referring to the same entity. These related nodes, in one illustrative embodiment can also be used during the matching process.

In addition, in an illustrative embodiment, certain relations and their values given a specific node type can be extracted as part of the matching sub-graph. For example, for the node type that corresponds to an event, the nuclear arguments of the event (such as the subject and/or object links, if present) can also be retained as part of the matching sub-graph. This improves the coherence of the sub-graph, especially in the embodiment in which the goal of identifying the sub-graph is to pass it to a generation component.

The entire sub-graph matched as described above is referred to as a graph fragment. In one illustrative embodiment, a cut-off threshold is used to determine a minimum score that will be used for matching, and the graph fragments that score above the minimum are kept for further processing.

In one illustrative embodiment, the graph fragments 224 are ordered according to the node and tuple score and are provided to generation component 208 which produces a natural language output for the graph fragments 224.

Alternatively, in one embodiment, optional discourse planning system 205 is also provided. Planning system 205 receives graph fragments 224 and produces an optimal ordering of the graph fragments not only taking into account the node and tuple scores for the graph fragments, but also accounting for the placement of similar nodes, and the order in which two nodes (related through part of speech) occur, and high level considerations, such as event timeline, topic and focus, etc. For instance, assume that three sentences (S1, S2 and S3) are to be generated, and if only scores were considered, the sentence order would be S1 S2 S3. However, if sentences S1 and S3 both mention the same entity, the planning system 205 will produce S1 S3 S2, and may also replace the entity in S3 with a pronoun, or sentences S1 and S3 may be combined into one longer sentence. Grouping sentences that involve common nodes increases the readability of the generated summary.

Similarly, assume that two sentences S1 and S2 both mention, for example, the words "arrest", but it is used in S1 as a noun and in S2 as a verb. Planning system 205 re-orders the sentence to S2 S1. This produces a summary that mentions, for example "X got arrested yesterday . . ." and then "the arrest . . .", which again increases readability of the generated summary.

In any case, based on the additional considerations, planning system 205 reorders the graph fragments 224 and provides them as re-ordered graph fragments 225 to generation component 208. The optional step of reordering graph fragments with discourse planning system 205 is indicated by block 224 in FIG. 3.

A set of graph fragments are provided to generation component 208. Generation component 208 can then generate output text 226 based on the graph fragments received. This is indicated by block 228 in FIG. 3.

The generation component 208 must simply be consistent with the type of graph fragment it is receiving. Component 208 can be rules-based, such as found in Aikawa, T., M. Melero, L. Schwartz, and A. Wu. (2001). *Multilingual Sentence Generation*, In *Proceedings of 8th European Workshop on Natural Language Generation*, 1 Toulouse, and Aikawa, T., M. Melero, L. Schwartz, and A. Wu. (2001). *Sentence Generation for Multilingual Machine Translation,* In *Proceedings of the MT Summit VIII*, Santiago de Compostela, Spain. It can also be machine-learned, such as found in Gamon, M., E. Ringger, and S. Corston-Oliver. 2002. *Amalgam: A machine-learned generation module*. Microsoft Research Technical Report: MSR-TR-2002-57

At this point, an example may be useful. Assume input text 210 includes the following group of sentences:

Pinochet was reported to have left London Bridge Hospital on Wednesday.

President Eduardo Frei Ruiz_Tagle said that Pinochet, now an unelected senator for life, carried a diplomatic passport giving him legal immunity.

The arrest of Gen. Augusto Pinochet shows the growing significance of international human_rights law.

Former Chilean dictator Gen. Augusto Pinochet has been arrested by British police, despite protests from Chile that he is entitled to diplomatic immunity.

The individual graphs (logical forms) for each individual sentence are as follows:

Pinochet was reported to have left London Bridge Hospital on Wednesday.

```
report2     ({Verb} (.))
   Tsub     _X2 ({Pron})
   Tobj     leave2 ({Verb})
                Time    Wednesday2 ({Noun} {on})
                Tsub    Pinochet2 ({Noun})
                Tobj    London_Bridge_Hospital2 ({Noun})
                            PLACENAME   London1 ({Noun})
                            PLACETYPE   bridge1 ({Noun})
                            PLACETYPE   hospital1 ({Noun})
                            FactHyp     hospital2 ({Noun})
```

President Eduardo Frei Ruiz_Tagle said that Pinochet, now an unelected senator for life, carried a diplomatic passport giving him legal immunity.

```
say1 ({Verb} (.))
   Tsub         President_Eduardo_Frei_Ruiz_Tagle1
({Noun})
                TITLE   president1 ({Noun})
                FIRSTNAME  Eduardo1 ({Noun})
                LASTNAME   Frei1 ({Noun})
                LASTNAME   Ruiz_Tagle1 ({Noun})
                FactHyp    person1 ({Noun})
   Tobj         carry1 ({Verb})
                Tsub    Pinochet2      ({Noun})
                            Appostn  senator2       ({Noun})
                                Time           now1
```

```
        ({Adv})
                                              Attrib
unelected2     ({Adj})
                                   for              life1
({Noun})
              Tobj    passport1    ({Noun})
                      Attrib       diplomatic1
({Adj})
                                   give1 ({Verb})
                                   Tsub
passport1
                                   Tobj
immunity1 ({Noun})
Attrib legal1 ({Adj})
                                   Tind             he1
({Pron})
```

The arrest of Gen. Augusto Pinochet shows the growing significance of international human_rights law.

```
show2 ({Verb} (.))
   Tsub    arrest3 ({Noun})
              Possr   Gen._Augusto_Pinochet3 ({Noun})
                        TITLE       Gen.1 ({Noun})
                        FIRSTNAME   Augusto1 ({Noun})
                        LASTNAME    Pinochet1 ({Noun})
                        FactHyp     person1 ({Noun})
   Tobj    significance3 ({Noun})
              Attrib    grow3 ({Verb})
                          Tsub      significance3
```

```
                of       law3 ({Noun})
                           Mod     human_rights3 ({Noun})
                                     Attrib
      international3 ({Adj})
```

Former Chilean dictator Gen. Augusto Pinochet has been arrested by British police, despite protests from Chile that he is entitled to diplomatic immunity.

```
arrest2 ({Verb} (.))
   Tsub     police3 ({Noun})
              Attrib    British3 ({Adj})
              despite   protest2 ({Noun})
                          Props     entitle1      ({Verb})
                                      Tsub        _X1 ({Pron})
                                      Tobj        he1 ({Pron})
                                      to
                                      diplomatic_immunity1 ({Noun})
                          Source    Chile2 ({Noun} {from})
   Tobj     dictator2 ({Noun})
              Apposzn Gen._Augusto_Pinochet2 ({Noun})
                        TITLE      Gen.1 ({Noun})
                        FIRSTNAME  Augusto1 ({Noun})
                        LASTNAME   Pinochet1 ({Noun})
                        FactHyp    person1 ({Noun})
              Attrib    Chilean2 ({Adj})
                        former2 ({Adj})
```

Figure 4:
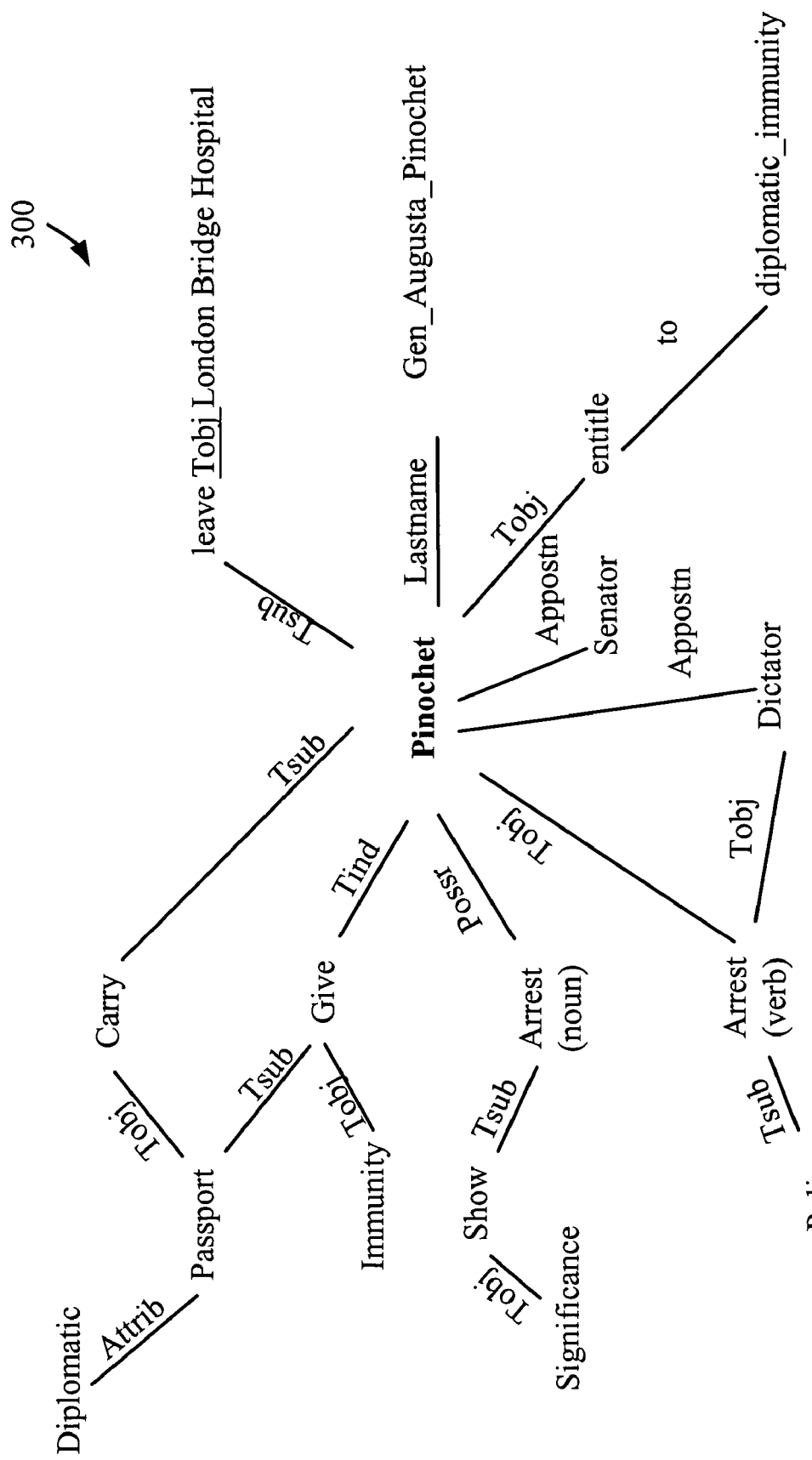
FIG. 4 illustrates an exemplary graph generated for a sample input text.

FIG. 4 illustrates a graph 300 centered on the node for "Pinochet", connecting the nodes from the logical forms for the input sentences. Graph 300 is also represented virtually as follows:

```
      leave2         ({Verb})
                       Tsub        Pinochet2 ({Noun})
                       Tobj        London_Bridge_Hospital2 ({Noun})
      carry1         ({Verb})
                       Tsub        Pinochet2 ({Noun})
                       Tobj        passport1 ({Noun})
                                     Attrib diplomatic1 ({Adj})
      Pinochet2      ({Noun})
                       Apposzn        senator2 ({Noun})
      give1          ({Verb})
                       Tsub        passport1
                       Tobj        immunity1 ({Noun})
                       Tind        he1 ({Pron} Refs: Pinochet)
      show2          ({Verb}       (.))
                       Tsub        arrest3 ({Noun})
                                     Possr        Gen._Augusto_Pinochet3
({Noun})
   Tobj                              significance3 ({Noun})
arrest2 ({Verb} (.))
   Tsub                              police3 ({Noun})
   Tobj                              dictator2 ({Noun})
                                       Apposzn Gen._Augusto_Pinochet2 ({Noun})
entitle1 ({Verb})
   Tsub                              _X1 ({Pron})
   Tobj                              he1 ({Pron} Refs: Pinochet)
   to                                diplomatic_immunity1 ({Noun})
dictator2 ({Noun})
   Apposzn Gen._Augusto_Pinochet2 ({Noun})
Gen._Augusto_Pinochet3 ({Noun})
      TITLE      Gen.1 ({Noun})
      FIRSTNAME  Augusto1 ({Noun})
      LASTNAME   Pinochet1 ({Noun})
      FactHyp    person1 ({Noun})
```

It can be seen that the nodes in graph 300 that link to Pinochet are the following:

```
leave2        ({Verb})
              Tsub       Pinochet2 ({Noun})
carry1        ({Verb})
              Tsub       Pinochet2 ({Noun})
```

Note that anaphora resolution is used to resolve "he" to "Pinochet"

```
give1         ({Verb})
              Tind       he1 ({Pron} Refs: Pinochet)
arrest3 ({Noun})
              Possr    Gen._Augusto_Pinochet3 ({Noun})
```

Note that the Appostn relation is "unpacked" to result in two (or however many Appostns there are) links. So that from this Logical Form, in addition to the link "arrest-Tobj-dictator", the link "arrest—Tobj—Gen._Augusto_Pinochet" is also identified.

```
arrest2       ({Verb} (.))
      Tsub       polices ({Noun})
      Tobj       dictator2 ( {Noun} )
                     Appostn   Gen._Augusto_Pinochet2
({Noun})
arrest2       ({Verb} (.))
      Tobj       Gen._Augusto_Pinochet2 ({Noun})
              Note that anaphora resolution is used to
resolve "he" to "Pinochet"
entitle1      ({Verb})
      Tobj       he1 ({Pron} Refs: Pinochet)
```

It can also be seen that the nodes that Pinochet links to are the following:

```
Pinochet2              ({Noun})
                       Appostn   senator2 ({Noun})
dictator2 ({Noun})
              Appostn   Gen._Augusto_Pinochet2 ({Noun})
```

Note that this last logical form indicates the "similar word" concept discussed above, in that if the node under consideration is Gen._Augusto_Pinochet, the node "Pinochet" is also included. This is based on the LASTNAME rein:

```
Gen._Augusto_Pinochet3 ({Noun})
      TITLE    Gen.1 ({Noun})
      FIRSTNAME  Augusto1 ({Noun})
      LASTNAME   Pinochet1 ({Noun})
      FactHyp    person1 ({Noun})
```

The following node scores show an example of just a portion of the entire graph for this cluster, so the scores are indicative rather than exact:
Pinochet_Noun 8.86931560843612
arrest_Noun 5.65798261000217
dictator_Noun 4.66735025856776
leave_Verb 3.19016764263043
show_Verb 3.05887157398304
arrest_Verb 2.99724084165062
immunity_Noun 2.61908266128404
give_Verb 2.59211486749912
police_Noun 2.23721253134214
Gen._Augusto_Pinochet_Noun 2.14890018458375
senator_Noun 1.99746859744986
diplomatic_immunity_Noun 1.52760640157329
carry_Verb 1.4547668737008
passport_Noun 1.08547333802503
diplomatic_Adj 0.949668310003334
entitle_Verb 0.760364251949961
significance_Noun 0.518215630826775
London_Bridge_Hospital_Noun 0.493827515638096

The following are exemplary tuple scores. Note that the scores are with respect to the left node, so "arrest_Possr_Pinochet" has a higher score than "arrest_Tsub_police", but nothing can be inferred from the weight as to whether "arrest_Tsub_police" scores higher/lower than "carry_Tobj_passport".
arrest_Noun Possr Pinochet_Noun 0.9674310
arrest_Verb Tobj Pinochet_Noun 0.9137349
arrest_Verb Tsub police_Noun 0.5801700
carry_Verb Tsub Pinochet_Noun 0.9916259
carry_Verb Tobj passport_Noun 0.7846062
entitle_Verb Tobj Pinochet_Noun 0.9956231
entitle_Verb "to" diplomatic_immunity_Noun 0.8876522
Gen._Augusto_Pinochet_Noun Appostn dictator_Noun 0.7838148
give_Verb Tind Pinochet_Noun 0.8829976
give_Verb Tsub passport_Noun 0.8081048
give_Verb Tobj immunity_Noun 0.5551054
leave_Verb Tsub Pinochet_Noun 0.9449093
leave_Verb Tobj London_Bridge_Hospital_Noun 0.0713249
passport_Noun Attrib diplomatic_Adj 0.3981289
Pinochet_Noun Appostn senator_Noun 0.5996584
show_Verb Tsub arrest_Noun 0.9343253
show_Verb Tobj significance_Noun 0.1478469

The fragments are ranked by scores. In this example, fragments chosen rooted in Verb part of speech are ordered before fragments chosen rooted in Noun part of speech.

Note that Time and Tobj are also selected to be part of the graph fragment because they are both nuclear arguments to "leave", even though "London_Bridge_Hospital" itself is a low-scoring tuple.

```
1.    leave ({Verb}3.19016764263043)
      Time      Wednesday ({Noun} {on})
      Tsub      Pinochet ({Noun})
      Tobj      London_Bridge_Hospital ({Noun})
```

Note that "significant" is selected because it is a nuclear argument. Because "significance" is Noun, but with event properties, we also select arguments for the noun (Attrrib and "of")

```
2.    show ({Verb}3.05887157398304)
      Tsub     arrest ({Noun})
                Possr    Gen._Augusto_Pinochet
({Noun})
      Tobj     significance ({Noun})
                Attrib     grow ({Verb})
```

| | | Tsub significance | |
|---|---|---|---|
| ({Noun}) | of | human_rights ({Noun}) | |
| ({Adj}) | | Attrib international | |

Note that this is the tuple score for "arrest Tobj Pinochet" but "dictator" and "Pinochet" are the same entity, as identified through coreference

| 3. | arrest ({Verb}2.99724084165062) |
|---|---|
| | Tsub police ({Noun}) |
| | Tobj dictator ({Noun}) |
| | Locn London ({Noun}) |

Note that this is an example of a noun phrase that is available for expanding nodes in the graphs when the high-scoring events have either been used or when the weight limits have been reached.

| 4. | Pinochet ({Noun}8.86931560843612) |
|---|---|
| | Appostn senator ({Noun}) |
| | Attrib unelected ({Adj}) |

The following are examples of re-ordering and grouping similar/same nodes together when the optional planning system 205 is used:

The following shows Combining graph-fragments 1 and 4 since they both share the node for "Pinochet":

| leave ({Verb}) | | |
|---|---|---|
| Time | Wednesday ({Noun} {on}) | |
| Tsub | Pinochet ({Noun}) | |
| | Appostn | senator ({Noun}) |
| | | Attrib unelected ({Adj}) |
| Tobj | London_Bridge_Hospital ({Noun}) | |

The following shows reordering of graph-fragments 2 and 3 to reflect the preferred ordering of the same nodes with different parts of speech as Verb first, then Noun:

| arrest | ({Verb}) | | |
|---|---|---|---|
| | Tsub | police ({Noun}) | |
| | Tobj | dictator ({Noun}) | |
| | Locn | London ({Noun}) | |
| show | ({Verb}) | | |
| | Tsub | arrest ({Noun}) | |
| | | Possr | Gen._Augusto_Pinochet ({Noun}) |
| | Tobj | significance ({Noun}) | |
| | | Attrib | grow ({Verb}) |
| | | | Tsub significance ({Noun}) |
| | | of | human_rights ({Noun}) |
| | | | Attrib international ({Adj}) |

The following illustrates generation output 226. In this example, during generation, the referring expression is chosen for generation. Typically, that is the most specific referring expression first (Gen. Augusto Pinochet), a short form second (Pinochet), followed by pronominalization if it is in a nuclear argument position. Therefore, one embodiment of generation output 226 is as follows:

Gen. Augusto Pinochet, an unelected senator, left London Bridge Hospital on Wednesday.
Pinochet has been arrested in London by the police.
His arrest shows the growing significance of international human_rights.

It can thus be seen that the present invention provides distinct advantages over the prior art. The present invention ranks events based on a graph generated from the input text. This has been found to be more accurate when deciding what to include in a summary than word frequency-based approaches. Another aspect of the invention generates a summary given ranked graph fragments. This provides better coherence and readability than sentence extraction or compression for multi-document summaries.

Of course, it will also be appreciated that the present invention can be used in a wide variety of other applications as well. For instance, identifying words or text fragments or events in an input text by generating a graph for the input text and then calculating a score for the components of the graph is useful in many situations. It can be used, for example, when attempting to identify a relationship between two textual inputs, such as information retrieval, indexing, document clustering, question answering, etc. In those instances, the scores for words or tuples of a first input are compared against the scores for words or tuples of a second input to determine the relationship between the two inputs. In information retrieval, a first input is a query and the second input is either an index or a document being compared to the query. In question answering, the first input is a question and the second input is text being examined to determine whether it answers the question. In document clustering, the two inputs are documents or summaries thereof, or summaries of clusters. Similarly, the scores generated for the graph that covers the input text can be used in determining which terms in the document are used for indexing the input text, as well as any weights calculated for those terms.

Of course, the present invention can also be used as described to generate output text corresponding to the input text. The text can be a summary of a single document, the summary of a cluster, etc. Thus, while the present invention has been described primarily with respect to document summarization, the invention has wide applicability and is not to be limited to summarization.

Although the present invention has been described with reference to particular embodiments, workers skilled in the art will recognize that changes may be made in form and detail without departing from the spirit and scope of the invention.

What is claimed is:

1. A method of identifying a characteristic of interest represented by a textual input, comprising:
    building a graph with nodes and links corresponding to the textual input, a pair of nodes and a link between the nodes comprising a tuple;
    scoring sub-graph components of the graph by assigning a score to each node and each tuple in the graph, the score for each tuple being based on a score of an initial node in the tuple, scores for nodes linking to a target node in the tuple, and a frequency of the tuple in the textual input;
    identifying graph fragments of interest based on the scores; and
    performing text manipulation based on the identified graph fragments.

2. The method of claim 1 wherein the nodes correspond to words in the textual input or concepts represented by the textual input.

3. The method of claim 2 wherein building the graph further comprises generating the links as directed semantic relation names.

4. The method of claim 3 wherein building the graph further comprises generating a set of abstract analyses for the textual input.

5. The method of claim 4 wherein generating a set of abstract analyses comprises:
generating a set of directed acyclic graphs based on the textual input; and
connecting the set of directed acyclic graphs to one another.

6. The method of claim 1 wherein building the graph comprises:
generating a syntactic parse for text portions in the textual input;
generating a dependency structure from the syntactic parse; and
generating the graph from the syntactic parse.

7. The method of claim 1 wherein building the graph comprises:
identifying the nodes as adjacent or collocated words; and
identifying the links between the nodes.

8. The method of claim 7 wherein identifying the links comprises:
assigning directionality of the links arbitrarily.

9. The method of claim 7 wherein identifying the links comprises identifying the links and assigning directionality of the links based on a given part-of-speech associated with the nodes, using a heuristic.

10. The method of claim 7 wherein identifying the links comprises identifying the links and assigning directionality of the links based on a given part-of-speech associated with the nodes, using a machine learned method.

11. The method of claim 1 wherein identifying graph fragments of interest comprises:
matching sub-graph components of the graph to nodes and tuples having a sufficient score.

12. The method of claim 11 wherein identifying graph fragments of interest comprises:
identifying nodes, having a sufficient score, that are linked to the matched sub-graph components.

13. The method of claim 12 wherein identifying graph fragments comprises:
identifying a node outside a matched sub-graph component that has a predetermined relation to a node in the matched sub-graph component.

14. The method of claim 13 wherein identifying graph fragments comprises:
identifying certain relations, given a predetermined specific node type.

15. The method of claim 14 wherein all the matched sub-graph components and identified nodes and relations comprise the graph fragment.

16. The method of claim 15 wherein performing text manipulation comprises:
extracting the set of sub-graph components identified for a given portion of the textual input as a graph fragment.

17. The method of claim 16 wherein building a graph comprises:
generating a separate graph for each sentence in the textual input; and
connecting the separate graphs together to form an overall graph.

18. The method of claim 17 wherein extracting comprises:
extracting sub-graph portions, that have a sufficient score, from the overall graph.

19. The method of claim 17 wherein high scoring sub-graph portions of the overall graph comprise sub-graph portions of the overall graph that have a score that meets a threshold score value, and wherein extracting sub-graph portions comprises:
extracting portions of the separate graphs that spawned the high scoring sub-graph portions of the overall graph.

20. The method of claim 1 wherein performing text manipulation comprises one of summarization, information retrieval, question answering, document clustering, and indexing.

21. The method of claim 1 wherein performing text manipulation comprises: generating a textual output based on the extracted graph fragments.

22. The method of claim 1 and further comprising:
ordering the graph fragments based on scores corresponding to the graph fragments.

23. The method of claim 22 wherein ordering further comprises:
ordering the graph fragments based on factors in addition to the scores.

24. The method of claim 23 wherein the factors comprise one of placement of nodes and the order in which two nodes related through part of speech will occur, an event timeline determined from the textual input, and a topic determined for the textual input.

25. A method of identifying a characteristic of interest comprising one of words, text fragments, concepts, events, entities and topics, said characteristic of interest represented by a textual input, said method comprising:
building a graph comprising nodes linked by links corresponding to the textual input;
scoring sub-graph components of the graph;
identifying graph fragments of interest based on the scores;
ordering the graph fragments based on factors in addition to the scores, the factors comprising at least one of placement of nodes and an order in which two nodes related through part-of-speech will occur, an event timeline determined from the textual input, and a topic determined for the textual input; and
performing text manipulation based on the identified graph fragments.

* * * * *